United States Patent
Park

(10) Patent No.: US 9,436,329 B2
(45) Date of Patent: Sep. 6, 2016

(54) TOUCH SENSOR

(71) Applicant: Dongbu Hitek Co., Ltd., Gyeonggi-do (KR)

(72) Inventor: Hye Kyung Park, Gyeonggi-do (KR)

(73) Assignee: Dongbbu Hitek Co., Ltd., Gyeonggi-do (KR)

( * ) Notice: Subject to any disclaimer, the term of this patent is extended or adjusted under 35 U.S.C. 154(b) by 80 days.

(21) Appl. No.: 14/318,567

(22) Filed: Jun. 27, 2014

(65) Prior Publication Data

US 2015/0268760 A1 Sep. 24, 2015

(30) Foreign Application Priority Data

Mar. 24, 2014 (KR) .................. 10-2014-0033965

(51) Int. Cl.
*G06F 3/045* (2006.01)
*G06F 3/044* (2006.01)

(52) U.S. Cl.
CPC .................... *G06F 3/044* (2013.01)

(58) Field of Classification Search
CPC ........................ G06F 3/03547; G06F 3/044
USPC ............................. 345/173–174; 178/18.06
See application file for complete search history.

(56) References Cited

U.S. PATENT DOCUMENTS

| | | | | |
|---|---|---|---|---|
| 2012/0056822 A1* | 3/2012 | Wilson | .................. | G06F 3/0418 345/173 |
| 2012/0306801 A1* | 12/2012 | Rai | ....................... | G06F 3/0416 345/174 |
| 2013/0120312 A1* | 5/2013 | Takahashi | ............. | G06F 3/0418 345/174 |
| 2015/0130755 A1* | 5/2015 | Jain | ......................... | G06F 3/044 345/174 |
| 2015/0248188 A1 | 9/2015 | Heo | | |

FOREIGN PATENT DOCUMENTS

KR 2013-0057339 A 5/2013

OTHER PUBLICATIONS

Office Action from corresponding Korean Patent Application No. 10-2014-0033965 dated Jun. 30, 2015.

* cited by examiner

*Primary Examiner* — Adam J Snyder
(74) *Attorney, Agent, or Firm* — Patterson Thuente Pedersen P.A.

(57) ABSTRACT

A touch sensor includes a touch panel including driving lines, sensing lines, and a node capacitor formed between a driving line and a sensing line adjacent to one another, a driver for providing a driving signal to each of the driving lines, a sensor for converting a digital signal received from the sensing lines using an oversampling scheme to an oversampled digital signal; and a digital signal processor for downsampling the oversampled digital signal and filtering the downsampled digital signal, wherein, the digital signal processor generates the driving signal in response to a driving clock signal, and the driving signal includes a signal section for driving of the driving lines and a sink section for synchronizing the driving signal and the downsampled digital signal.

18 Claims, 8 Drawing Sheets

TOUCH SENSOR

This application claims the benefit of Korean Patent Application No. 10-2014-0033965, filed on Mar. 24, 2014, which is hereby incorporated by reference as if fully set forth herein.

BACKGROUND OF THE INVENTION

1. Field of the Invention

The present invention relates to a touch sensor.

2. Discussion of the Related Art

Input of a touch sensor may include a driving signal input through a capacitance between a sensing electrode and a driving electrode of a touch panel, and a noise signal input through a capacitance between a sensing node of the touch panel and an object (e.g., a finger) touching the touch panel, and a sensed signal may be obtained by mixing two signals.

A sensor of a touch sensor detects variation in mutual capacitance, and a digital processor of the touch sensor processes the detected variation in mutual capacitance to produce a digital signal. The digital signal is provided to device firmware, which in turn performs calculations for extraction of x and y coordinates corresponding to the variation in mutual capacitance. The firmware may then transfer the coordinates to a host as final touch location information. The resolution of information produced by the digital processor may be a factor determining the accuracy of the coordinate calculation provided by the firmware.

In some circumstances, interference from sources external to the touch sensor may interfere with operation of the touch sensor. For example, nearby fluorescent lights or spurious signals from a charging device coupled to the touch sensor may interfere with output of the touch sensor. For example, such interference may cause the output of an amplifier (e.g., an operating amplifier) of an analog signal sensor of the touch sensor to be outside a normal operating range or an output waveform of the analog signal sensor may be distorted due to overlap with noise. Such interference may prevent normal transfer of information from the touch sensor.

SUMMARY OF THE INVENTION

Accordingly, the present invention is directed to a touch sensor that substantially obviates one or more problems due to limitations and disadvantages of the related art.

An object of the present invention is to provide a touch sensor with an enhanced signal-to-noise ratio.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention as embodied and broadly described herein, a touch sensor includes a touch panel including driving lines, sensing lines, and a node capacitor formed between a driving line and a sensing line adjacent to one another. The touch sensor also includes a driver for providing a driving signal to each of the driving lines, a sensor for converting an analog signal received from the sensing lines using an oversampling scheme to an oversampled digital signal, and a digital signal processor for downsampling the oversampled digital signal and filtering the downsampled digital signal. The digital signal processor generates the driving signal in response to a driving clock signal, and the driving signal includes a signal section for driving of the driving lines and a sink section for synchronizing the driving signal and the downsampled digital signal.

The signal section may include a first section with a first voltage level, a second section with a second voltage level, and a third section with a third voltage level. The second voltage level may be less than the first voltage level and greater than the third voltage level, and the sink section may have the second voltage level.

The signal section may further include a fourth section with a second voltage level after the third section or a fifth section with a second voltage level before the first section.

The sensor may perform analog to digital conversion of an analog signal received from the sensing lines from an analog signal to a digital signal to output the oversampled digital signal based on a first sampling clock signal.

The digital signal processor may downsample the oversampled digital signal based on the first sampling clock signal.

The driving signal may be a periodic signal, and the sink section may be inserted between two adjacent signal sections.

A duration of the sink section may be a first difference determined by subtracting a remainder from a period of a second sampling clock signal, and the remainder may be a remainder obtained by dividing a period of the signal section by a period of a second sampling section.

The digital signal processor may include a first calculator for determining the period of the signal section by multiplying a first cycle number of the driving clock signal and a period of the driving clock signal. The first cycle number may be a cycle number of the driving clock signal for generation of the signal section.

The digital signal processor may further include a second calculator for determining a period of the second sampling clock signal by multiplying a downsampling multiple and a period of the first sampling clock signal.

The digital signal processor may further include a third calculator for determining a remainder by dividing the period of the signal section by the period of the second sampling clock signal.

The digital signal processor may further include a fourth calculator for determining a second difference by subtracting the remainder from the period of the second sampling clock signal.

The digital signal processor may further include a fifth calculator for dividing the second difference by the period of the driving clock signal to output a second cycle number of the driving clock signal according to a division result. The digital signal processor may generate the sink section in response to the driving clock signal during the second cycle number.

In another aspect of the present invention, a touch sensor includes a touch panel including driving lines, sensing lines, and a node capacitor formed between a driving line and a sensing line adjacent to each other. The touch panel further includes a driver for providing a driving signal including signal sections and a sink section inserted between the signal sections to each of the driving lines, a sensor for converting an analog signal received from the sensing lines to an oversampled digital signal based on a first sampling clock signal, and a digital signal processor for downsampling the oversampled digital signal based on a second sampling clock signal to output a downsampled digital signal. The digital signal processor generates the driving signal in response to a driving clock signal. Each of the signal sections includes a first section with a first voltage level, a second section with a second voltage level less than the first voltage level, and a third section with a third voltage level less than the second voltage level. The sink section has the second voltage level.

The duration of the sink section may be a difference determined by subtracting a remainder from a period of the second sampling clock signal, and the remainder may be a remainder obtained by dividing a period of the signal section by a period of the second sampling section.

The sensor may include an amplifier for amplifying a signal received from each of the sensing lines to output an amplification signal according to an amplification result, a comparator for comparing the amplification signal and a first reference signal to output a comparison signal according to a comparison result, and an analog-digital converter for converting the comparison signal to an oversampled digital signal based on the first sampling clock signal.

The analog-digital converter may include a delta unit for outputting a difference signal corresponding to a difference between the comparison signal and a feedback signal, a sigma unit for integrating the difference signal to output an integration signal according to an integration result, a quantizer for quantizing the integration signal in response to the first sampling clock signal to output the oversampled digital signal according to a quantization result, and a digital-analog converter for digital-analog converting the oversampled digital signal to output the feedback signal based on a conversion result.

The digital signal processor may include a decimator for downsampling the oversampled digital signal by as much as a predetermined downsampling multiple to output the downsampled digital signal according to a downsampling result.

The digital signal processor may further include a data storage for storing a first cycle number of the driving clock signal for formation of the signal section, a period of the driving clock signal, a downsampling multiple of the decimator, and a period of the first sampling clock signal.

The digital signal processor may further include a driving signal generator including a first calculator for multiplying the first cycle number and a period of the driving clock signal to determine a first period of the signal section. The digital signal processor may also include a second calculator for multiplying the downsampling multiple and a period of the first sampling clock signal to determine a second period of the second sampling clock signal. The digital signal processor may further include a third calculator for calculating a remainder obtained by dividing the first period by the second period, a fourth calculator for determining a difference according to a result obtained by subtracting the remainder from the second period, and a fifth calculator for determining a second cycle number of the driving clock signal for formation of the sink section according to a division result obtained by dividing the difference by a period of the driving clock signal.

The digital signal processor may further include a signal generator for generating the signal section based on the first cycle number of the driving clock signal stored in the data storage and for generating the sink section based on the second cycle number of the driving clock signal provided from the driving signal generator.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
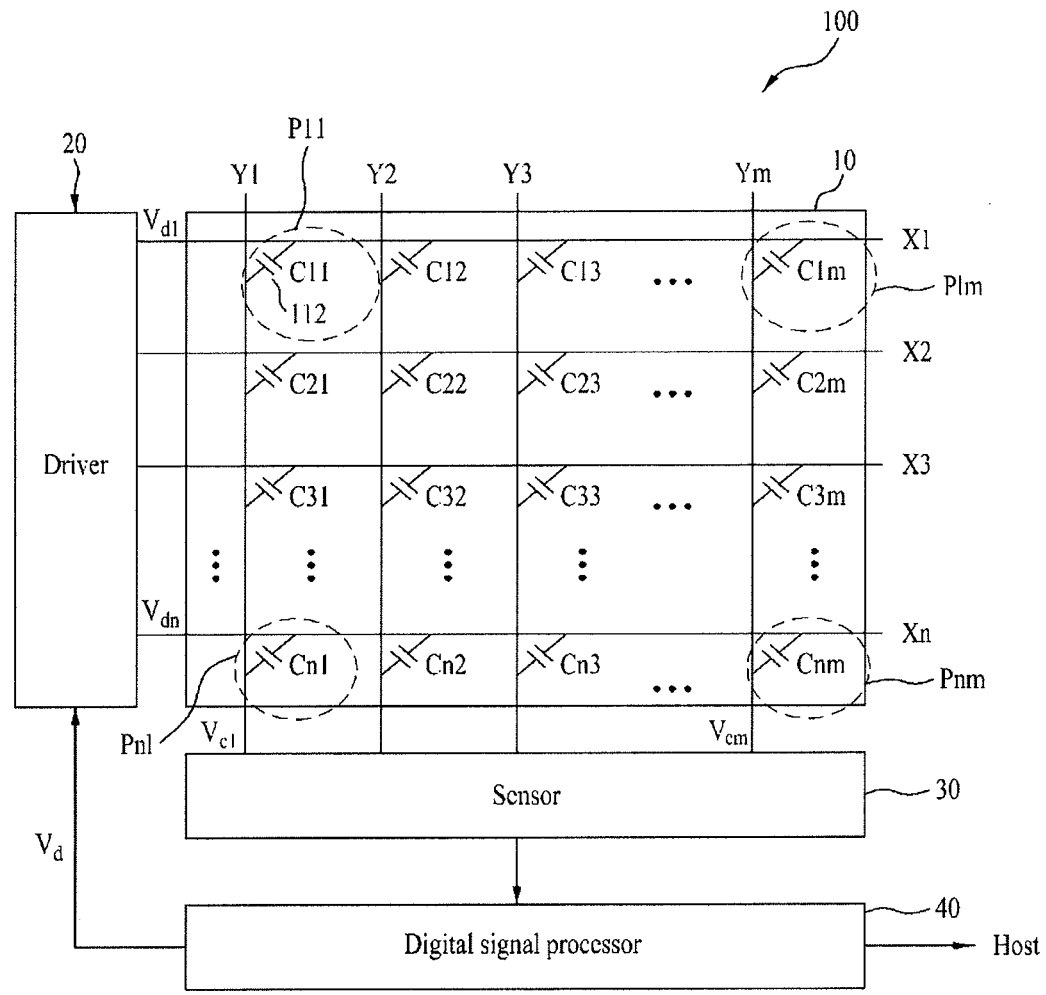
FIG. 1 is a block diagram of a touch sensor according to an embodiment of the present invention.

Reference will now be made in detail to the preferred embodiments of the present invention, examples of which are illustrated in the accompanying drawings. In description of elements, it will be understood that when an element or layer is referred to as being "on" or "under" another element or layer, the element or layer can be directly on another element or layer or intervening elements or layers, and criteria for "on" and "under" will be provided based on the drawings.

Elements in the following drawings may be exaggerated, omitted, or schematically illustrated for conveniences and clarity of explanation, and the sizes of elements do not reflect their actual sizes completely. In addition, the same reference numerals in the drawings denote the same elements.

FIG. 1 is a block diagram of a touch sensor 100 according to an embodiment of the present invention.

Referring to FIG. 1, the touch sensor 100 includes a touch panel 10, a driver 20, a sensor 30, and a digital signal processor 40.

The touch panel 10 may function substantially independently and may provide a plurality of sensing nodes P11 to Pnm (n and m each being a natural number greater than 1) present at different locations.

The sensing nodes P11 to Pnm may be interchangeably used with coordinates, sensing points, nodes, a sensing node array, or the like.

For example, the touch panel 10 may include a plurality of driving lines X1 to Xn, a plurality of sensing lines Y1 to Ym, and node capacitors C11 to Cnm formed between a driving line and a sensing line which are adjacent to each other.

The driving lines X1 to Xn may be interchangeably used with driving signal lines, driving electrodes, or the like.

In addition, the sensing lines Y1 to Ym may be interchangeably used with sensing signal lines, sensing electrodes, or the like.

As depicted in FIG. 1, the driving lines and sensing lines cross each other. However, embodiments of the present invention are not limited thereto. That is, the driving lines and the sensing lines may be embodied as not crossing each other.

Any one sensing node (e.g., P11) may be defined by any one node capacitor (e.g., C11) formed between any one driving line (e.g., X1) and any one sensing line (e.g., Y1) adjacent thereto.

For example, a driving line Xi (i being a natural number satisfying 0<i≤n) and a sensing line Yj (j being a natural number satisfying 0<j≤m) may be insulated and separated from each other. A node capacitor Cij may be formed between the driving line Xi and the sensing line Yj.

For example, the touch panel 10 may include an electrode pattern layer (not shown) including a sensing electrode and a driving electrode that are spaced apart from each other, a substrate (not shown) disposed in front of the electrode pattern layer, and an insulating layer (not shown) disposed behind the electrode pattern layer. A layout of the electrode pattern layer may have various shapes according to design method.

The electrode pattern layer may be formed of at least one among transmissive conductive materials, including, for example, indium tin oxide (ITO), tin oxide (TO), indium zinc oxide (IZO), indium tin zinc oxide (ITZO), indium aluminum zinc oxide (IAZO), indium gallium zinc oxide (IGZO), indium gallium tin oxide (IGTO), aluminum zinc oxide (AZO), antimony tin oxide (ATO), gallium zinc oxide (GZO), carbon nanotube (CNT), conductive polymer, silver (Ag) or copper (Cu) transparent ink.

The electrode pattern layer may be formed on one or more layers formed of glass or plastic via coating to form a sensing node array P11 to Pnm.

The substrate may be formed in the form of a dielectric film with high light transmittance and may include at least one of, for example, glass, polyethylene terephthalate (PET), polyethylene naphthalate (PEN), polyimide (PI), and acryl.

The insulating layer may be a transmissive insulating layer such as a PET layer, or the like. According to another embodiment of the present invention, a shielding layer (not shown) may be disposed below the insulating layer in order to remove electromagnetic interference (EMI) and noise introduced into the electrode pattern layer.

The touch panel 10 may be merged with a layer for display and the touch panel 10 and the layer may share a path for driving or sensing according to an appropriate panel design method. The touch panel that is not merged with the display may include a 2D sensing node array using an appropriate design method. Embodiments of the present invention may be applied to any touch sensing system including but not limited to a 2D sensing node array.

The driver 20 may be electrically connected to the plural driving lines X1 to Xn and may supply driving signals Vd1 to Vdn to the driving lines X1 to Xn.

The driver 20 may supply a driving signal to at least one of the plural driving lines X1 to Xn.

For example, the driver 20 may sequentially supply driving signals to the plural driving lines X1 to Xn or may simultaneously supply driving signals to two or more driving lines.

Here, the term "simultaneously" may refer to precisely simultaneous as well as approximately simultaneous. For example, the simultaneous cases may refer to cases that begin and end almost simultaneously and/or cases in which time periods at least partially overlap each other.

The driver 20 may include driving circuits that supply driving signals Vd1 to Vdn to the plural driving lines X1 to Xn.

Figure 2:
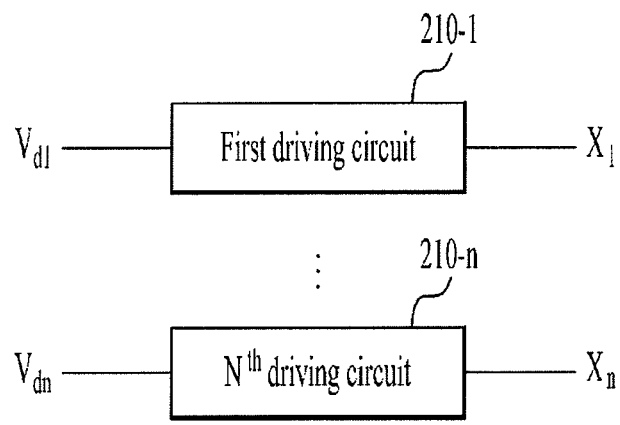
FIG. 2 is a block diagram illustrating a driver illustrated in FIG. 1 according to an embodiment of the present invention.

FIG. 2 is a block diagram illustrating the driver 20 illustrated in FIG. 1 according to an embodiment of the present invention.

Referring to FIG. 2, the driver 20 may include first to $n^{th}$ driving circuits 210-1 to 210-$n$ (n being a natural number greater than 1).

The first to nth driving circuits 210-1 to 210-$n$ may supply driving signals Vd1 to Vdn to the driving lines X1 to Xn.

For example, each of the first to nth driving circuits 210-1 to 210-$n$ may supply a corresponding one of the driving signals Vd1 to Vdn to a corresponding one of the plural driving lines X1 to Xn.

The sensor 30 may be electrically connected to the plural sensing lines Y1 to Ym (m is a natural number greater than 1) and may detect capacitance of a node capacitor between a driving line with a driving signal supplied thereto and a sensing line corresponding to the driving line.

The sensor 30 may output a digital signal corresponding to variation in capacitance of the nodes P11 to Pnm due to presence and absence of touch on the touch panel 10.

Figure 3:
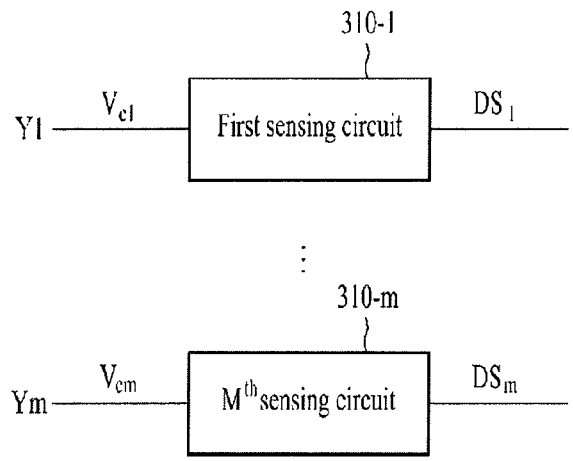
FIG. 3 is a block diagram illustrating a sensor illustrated in FIG. 1 according to an embodiment of the present invention.

FIG. 3 is a block diagram illustrating the sensor 30 illustrated in FIG. 1 according to an embodiment of the present invention.

Referring to FIG. 3, the sensor 30 includes first to $m^{th}$ sensing circuits 310-1 to 310-$m$ (m being a natural number greater than 1).

Each of the first to $m^{th}$ sensing circuits 310-1 to 310-$m$ may be connected to corresponding one of the plural sensing lines Y1 to Ym and may sense a signal received through a corresponding one of the sensing lines to output digital signals $DS_1$ to $DS_m$ according to the sensing result.

Figure 4:
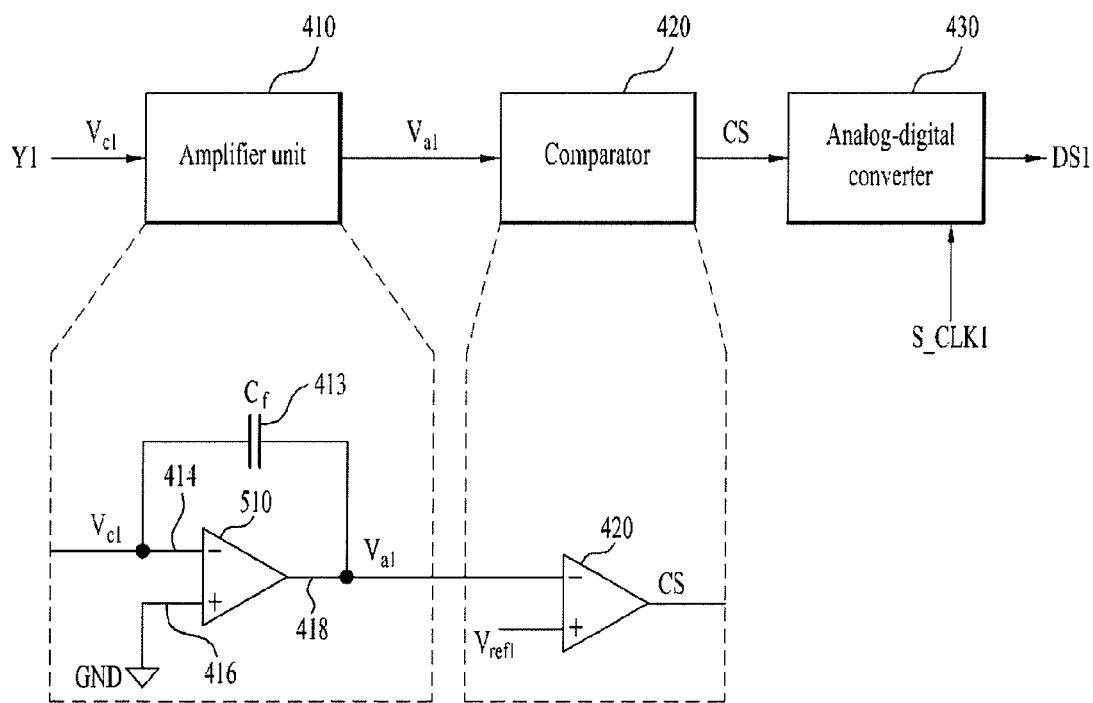
FIG. 4 illustrates an embodiment of a first sensing circuit illustrated in FIG. 3.

FIG. 4 illustrates an embodiment 501 of the first sensing circuit 310-1 illustrated in FIG. 3.

The sensing circuits 310-1 to 310-$m$ illustrated in FIG. 3 may have the same structure. Thus, only the structure of the first sensing circuit 310-1 will be described below and a detailed description of the remaining driving circuits will be omitted to avoid repetition.

Referring to FIG. 4, the first sensing circuit 501 may amplify the signal Vc1 received through the first sensing line Y1 and compare the amplified signal and a first reference voltage Vref1 to output a comparison signal CS1 according to the comparison result. The first sensing circuit 501 may also convert the analog comparison signal CS1 to the digital signal DS1.

The first reference voltage Vref1 may be a voltage corresponding to a signal received to the sensing line Y1 or a reference signal that is configured by a of circuit and is internally generated when a touch is not present on the touch panel 10.

The first sensing circuit 310-1 may include an amplifier unit 410, a comparator 420, and an analog-digital converter 430.

The amplifier unit 410 amplifies the signal Vc1 received through the first sensing line Y1 to output the amplified signal Va1 (hereinafter, referred to as "amplification signal").

The amplifier unit 410 may include an amplifier 412, and a feedback capacitor 413.

The amplifier 412 may include a first input terminal 414 (e.g., an inverting terminal) connected to corresponding one of sensing lines (e.g., Y1), a second input terminal 416 (e.g., a non-inverting terminal) connected to a ground source, and an output terminal 418 for output of the amplification signal Va1.

The amplifier 412 may be a differential amplifier for differentially amplifying the first signal Vc1 input to the first input terminal 414 and a second signal GND input to the second input terminal 416. In FIG. 4, the amplifier 412 is an operating amplifier embodied as a field effect transistor (FET) or a bipolar junction transistor (BJT), but it should be appreciated that various other amplifier configurations may be employed and that embodiments are not limited thereto.

The feedback capacitor 413 may be electrically connected between the first input terminal 414 and the output terminal 418 of the amplifier 412.

The feedback capacitor 413 may provide negative feedback of the output signal Va1 of the amplifier 412 to the first input terminal 414.

Although not illustrated in FIG. 4, according to another embodiment of the present invention, the amplifier unit 410 may further include a feedback resistor (not shown) that is electrically connected between the output terminal 418 and the first input terminal 414 of the amplifier 412. For example, the feedback resistor and the feedback capacitor 413 may be connected in parallel to each other between the output terminal 418 and the first input terminal 414 of the amplifier 412.

The comparator 420 compares the amplification signal Va1 and the first reference voltage Vref1 to output the comparison signal CS1 according to the comparison result. In this case, the first reference voltage Vref1 may be a voltage corresponding to a signal received to the sensing line Y1 or a reference signal that is configured in terms of circuit and is internally generated when touch is not present on the touch panel 10.

The analog-digital converter 430 analog-digital converts the comparison signal CS1 output by the comparator 420 to output the digital signal DS1 according to the conversion result.

The analog-digital converter 430 may be embodied as a delta-sigma analog-digital converter. The delta-sigma analog-digital converter may remove quantizing noise via an oversampling scheme and the use of feedback. That is, the analog-digital converter 430 may include a quantizer for converting an analog signal into a digital signal, and the quantizer may oversample the comparison signal CS1 using a first sampling clock signal. The delta-sigma analog-digital converter may be embodied as a primary or higher order circuit.

Figure 5:
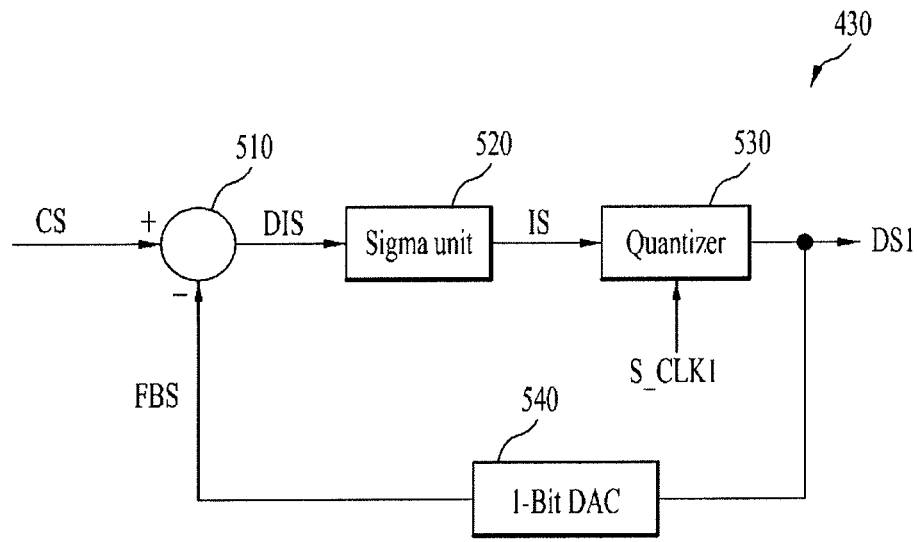
FIG. 5 illustrates an embodiment of an analog-digital converter illustrated in FIG. 4.

FIG. 5 illustrates an embodiment of the analog-digital converter 430 illustrated in FIG. 4.

Referring to FIG. 5, the analog-digital converter 430 may be configured as a primary circuit and may include a delta unit 510, a sigma unit 520, a quantizer 530, and a 1-bit DAC 540.

The delta unit 510 generates and outputs a difference signal DIS corresponding to difference between a feedback signal FBS and the comparison signal CS1 as an analog signal. For example, the delta unit 510 may be a differential amplifier, without being limited thereto.

The sigma unit 520 integrates the difference signal DIS and outputs an integrated signal IS according to the integration result.

The quantizer 530 quantizes the integrated signal IS in response to a first sampling clock signal S-CLK1 and outputs the digital signal DS1 based on the quantization result.

For example, the quantizer 530 may be a 1-bit quantizer but it should be appreciated that the quantizer 530 is not limited thereto. For example, the quantizer 530 may be a multi-bit quantizer.

The quantizer 530 may output the digital signal DS1 as a value of 1 wherein a section of the integrated signal IS is positive (+) and 0 where the integrated signal IS is negative (−). The digital signal DS1 may be a bit stream of 0s and 1s.

The 1-bit DAC 540 may convert the digital signal DS1 into an analog feedback signal FBS according to the conversion result. The feedback signal FBS may be provided to the delta unit 510.

For example, when the digital signal DS1 is 1, the 1-bit DAC 540 may output a first reference voltage +Vref1 as the feedback signal FBS, and when the digital signal DS1 is 0, the 1-bit DAC 540 may output a second reference voltage −Vref1 as the feedback signal FBS.

The digital signal processor 40 may downsample the digital signals $DS_1$ to $DS_m$ (m being a natural number greater than 1) output from the first to mth sensing circuits 310-1 to 310-$m$ and perform various digital signal processes (e.g., filtering) on the downsampled digital signals.

Figure 6:
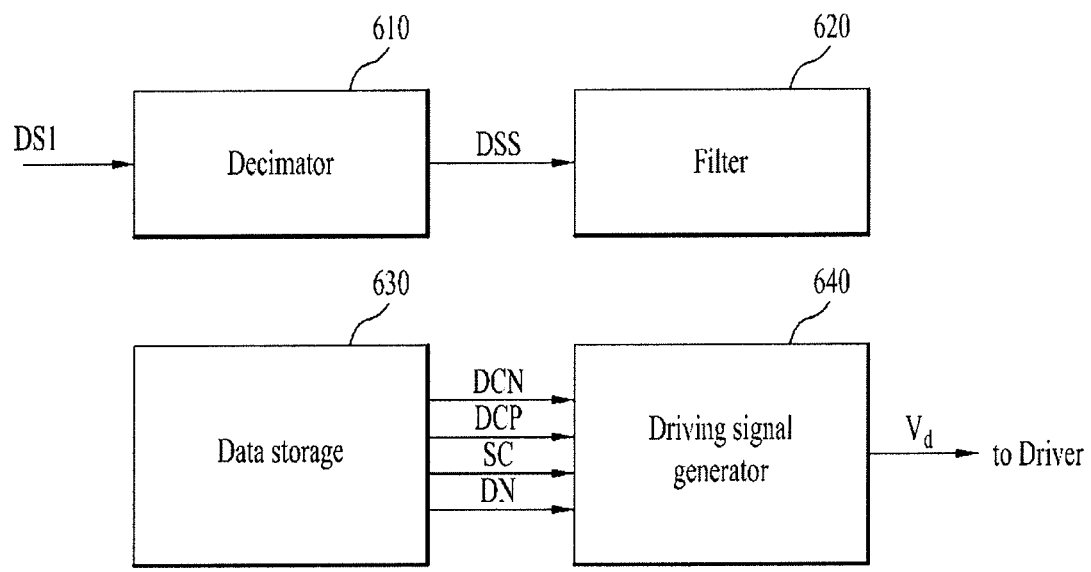
FIG. 6 is a diagram illustrating a structure of a digital signal processor.

FIG. 6 is a diagram illustrating a structure of the digital signal processor 40.

Referring to FIG. 6, the digital signal processor 40 may include a decimator 610, a filter 620, a data storage 630, and a driving signal generator 640.

The decimator 610 downsamples the digital signal DS1 oversampled by the quantizer 530 before the filter 620 filters the digital signal DS1. The digital signal DS1 is downsampled in order to reduce time to process digital filtering.

The digital signal processor 40 may further include a low pass filter that low-passes the digital signal DS1 in order to remove quantizing noise aliased in a baseband before the decimator 610 downsamples the digital signal DS1.

The decimator 610 may convert a high sampling rate of the quantizer 530 into a data stream with a low sampling rate.

The decimator 610 may include a cascaded integrator comb (CIC) filter including multiple-stages and a half band filter.

The decimator 610 may downsample the digital signal DS1 by as much as a downsampling multiple (e.g., DN) to output the downsampled digital signal DSS.

For example, in order to prevent aliasing caused by an interference signal present in an adjacent channel during a downsampling process, an order of the CIC filter may be an integer multiple of the downsampling multiple (e.g., DN).

The data storage 630 may store a first cycle number DCN of a driving clock signal D_CLK for formation of a signal section TS of a driving signal $V_d$, a period DCP of a driving clock signal D_CLK, the downsampling multiple DN of the decimator 610, and a period SC of the first sampling clock signal S-CLK1 of the quantizer 530.

The driving signal generator 640 may receive the first cycle number DCN of the driving clock signal D_CLK for formation of the signal section TS of the driving signal $V_d$, the period DCP of the driving clock signal D_CLK, the downsampling multiple DN of the decimator 610, and the period SC of the first sampling clock signal S-CLK1 of the quantizer 530 from the data storage 630.

The driving signal generator 640 may calculate a second cycle number IDC of the driving clock signal D_CLK for formation of a sink section SP using the information DCN, DCP, DN, and SC provided from the data storage 630.

The driving signal generator 640 may generate the signal section TS based on the first cycle number DCN of the driving clock signal D_CLK and generate the sink section SP based on the second cycle number IDC of the driving clock signal D_CLK.

The driving signal generator 640 may generate the driving signal $V_d$ including the signal section TS and the sink section SP during one period. The signal section TS may include sections with three different voltage levels. The sink section SP may have the same voltage level as an intermediate voltage level among the three different voltage levels of the signal section TS.

Figure 7:
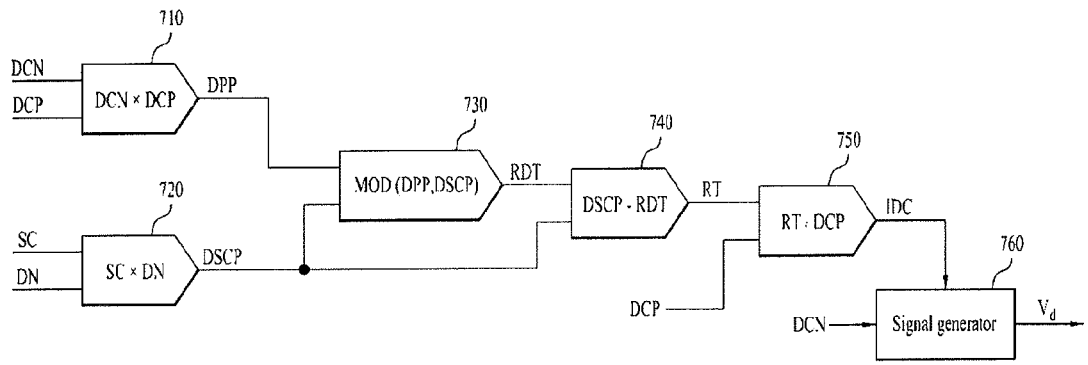
FIG. 7 is a diagram illustrating a structure of a driving signal generator illustrated in FIG. 6.

FIG. 7 is a diagram illustrating a structure of the driving signal generator 640 illustrated in FIG. 6.

Referring to FIG. 7, the driving signal generator 640 may include a first calculator 710, a second calculator 720, a third calculator 730, a fourth calculator 740, a fifth calculator 750, and a signal generator 760.

The first calculator 710 may receive the first cycle number DCN of the driving clock signal D_CLK and the period DCP of the driving clock signal D_CLK from the data storage 630.

Here, the first cycle number DCN of the driving clock signal D_CLK may be a cycle number of the driving clock signal D_CLK for generation of the signal section TS of the driving signal $V_d$.

For example, when the signal section TS includes first through third sections P1 to P3 (see, e.g., FIG. 8A) with different voltage levels, the first cycle number DCN may include information (see, e.g., N1, N2, and N3 of FIG. 10A) about a cycle number of the driving clock signal D_CLK corresponding to each of the first through third sections P1 to P3.

The first calculator 710 may multiply the first cycle number DCN of the driving clock signal D_CLK and the period DCP of the driving clock signal D_CLK (DCN× DCP) and output a first period DPP of the signal section TS based on the multiplication result.

For example, the signal section TS may be generated for time duration corresponding to the first cycle number of the driving clock signal D_CLK, and the first period may be a period DPP of the signal section TS.

The second calculator 720 receives the downsampling multiple DN and the period SC of the first sampling clock signal S-CLK1 from the data storage 630.

The second calculator 720 may multiply the downsampling multiple DN from the data storage 630 and the period SC of the first sampling clock signal S-CLK1 (DN×SC) and output a second period DSCP based on the multiplication result.

The second period DSCP may be a period of a second sampling clock signal S_CLK2, and the second sampling clock signal S_CLK2 may be a downsampling clock signal of the digital signal processor 40. For example, the second period DSCP may be a period of the downsampling clock signal S_CLK2 of the decimator 610.

For example, the first calculator 710 and the second calculator 720 may each be a multiplier.

The third calculator 730 receives the first period DPP from the first calculator 710 and receives the second period DSCP from the second calculator 720.

The third calculator 730 divides the first period DPP by the second period DSCP (DPP/DSCP) and outputs a remainder RDT according to the division result.

MOD (DPP and DSCP) may refer to a function for acquiring a remainder by dividing the first period DPP by the second period DSCP, and the third calculator 730 may be embodied as a logical circuit for accomplishment of a function for acquisition of a remainder.

Here, the presence of the remainder RDT refers to a case in which the signal section TS is not synchronized with the downsampling clock signal S_CLK2 of the digital signal processor 40.

The fourth calculator 740 receives the second period DSCP from the second calculator 720 and receives the remainder RDT from the third calculator 730.

The fourth calculator 740 subtracts the remainder RDT from the second period DSCP (DSCP-RDT) and outputs a difference RT according to the subtraction result.

The difference RT may refer to minimum time required for synchronization between the signal section TS and the downsampling clock signal S_CLK2 of the digital signal processor 40. That is, the difference RT may refer to duration of the sink section SP.

The fifth calculator 750 may receive the period DCP of the driving clock signal D_CLK from the data storage 630 and receive the difference RT from the fourth calculator 740.

The fifth calculator 750 divides the difference RT by the driving clock signal D_CLK and outputs the second cycle number IDC of the driving clock signal D_CLK according to the division result. Each of the first to fifth calculators 710 to 750 may be a logical circuit.

The duration of the sink section SP may correspond to the second cycle number IDC of the driving clock signal D_CLK.

The signal generator 760 generates the signal section TS based on the first cycle number DCN of the driving clock signal D_CLK provided from the data storage 630 and generates the sink section SP based on the second cycle number IDC of the driving clock signal D_CLK calculated by the first to fifth calculators 710 to 750.

Figure 8A:
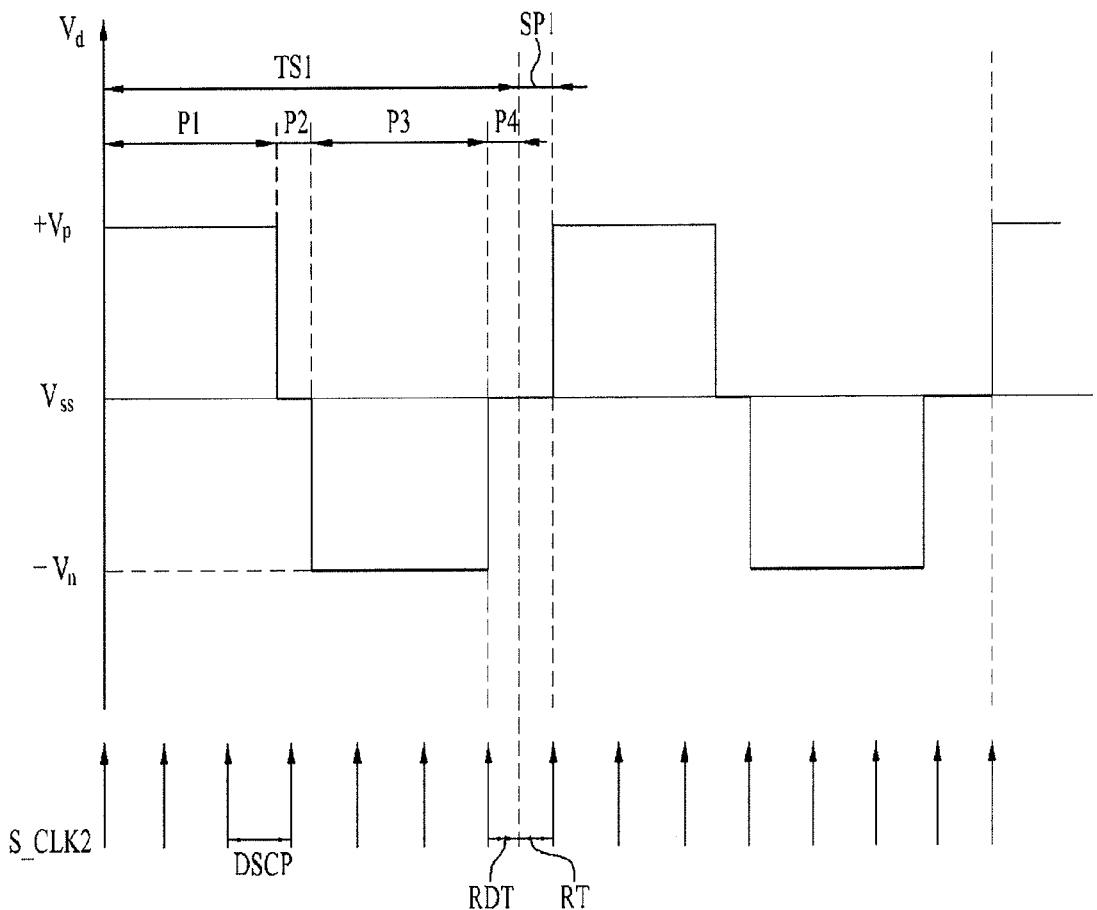
FIG. 8A illustrates an embodiment of a driving signal generated by a driving signal generator illustrated in FIG. 7.

FIG. 8A illustrates an embodiment of the driving signal $V_d$ generated by the driving signal generator 640 illustrated in FIG. 7.

Referring to FIG. 8A, the driving signal $V_d$ may include a signal section TS1 and a sink section SP1 for one period.

The signal section TS1 may include a first section P1 with a first voltage level+$V_p$, a second section P2 with a second voltage level $V_{ss}$, a third section P3 with a third voltage level $-V_n$, and a fourth section P4 with the second voltage level $V_{ss}$. The first voltage level+$V_p$, the second voltage level $V_{ss}$, and the third voltage level $-V_n$ may be different voltage levels.

For example, the second voltage level $V_{ss}$ may be less than the first voltage level+$V_p$, may be greater than the third voltage level $-V_n$, or may be a zero (0) voltage level, but is not limited thereto. The first to fourth sections P1 to P4 may be sequentially and continuously connected.

For example, the duration of the second section P2 and the duration of the fourth section P4 may be shorter than the duration of the first section P1 and the duration of the third section P3, respectively. The duration of the first section P1 and the duration of the third section P3 may be the same, and the duration of the second section P2 and the duration of the fourth section P4 may be the same. However, it should be appreciated that embodiments of the present invention are not limited thereto.

The sink section SP1 may have the second voltage level $V_{ss}$. The time or period of the sink section SP1 will be described below.

The driving signal $V_d$ may be a period signal. For example, the driving signal $V_d$ may be a period signal in which the signal section TS1 and the sink section SP1 are repeated at least twice.

The sink section SP1 may be positioned between the fourth section P4 as one of two adjacent signal sections and the first section P1 as the other one.

Figure 8B:
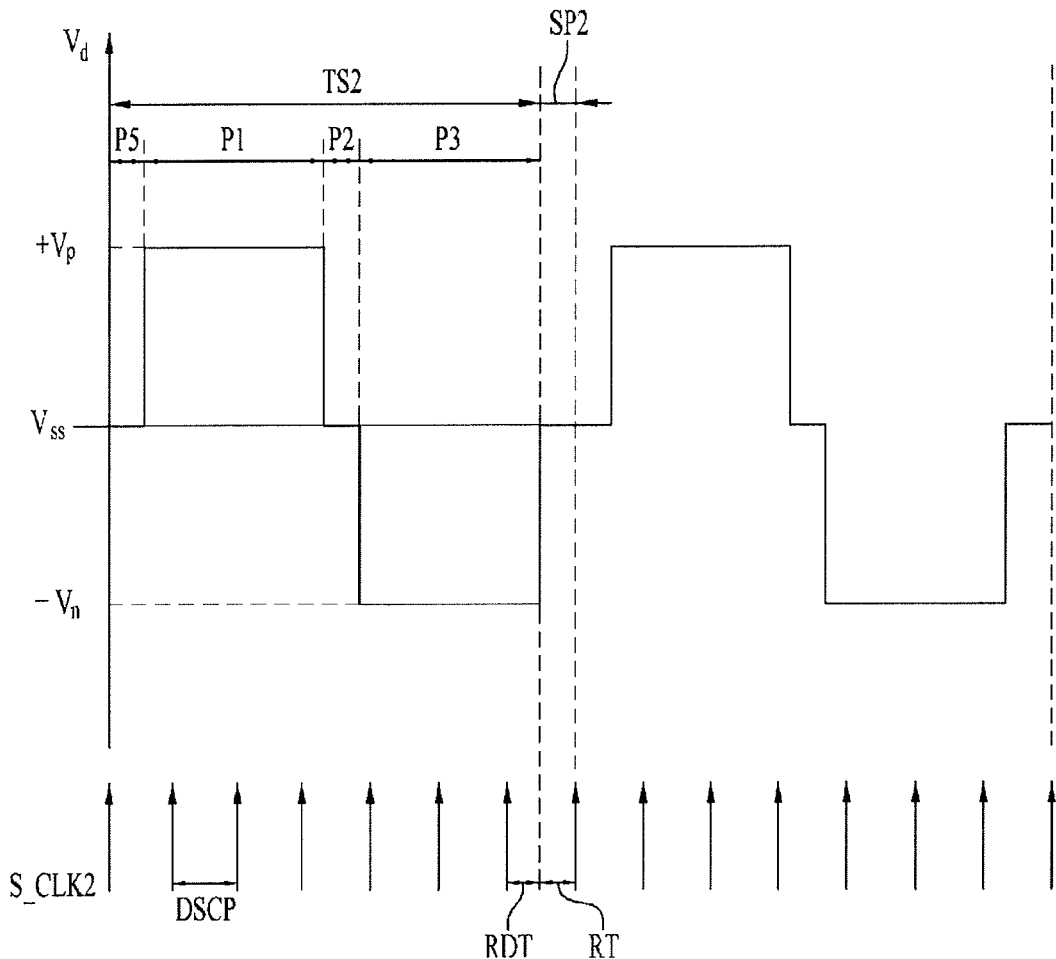
FIG. 8B illustrates another embodiment of a driving signal generated a driving signal generator illustrated in FIG. 7.

FIG. 8B illustrates another embodiment of the driving signal $V_d$ generated by the driving signal generator 640 illustrated in FIG. 6.

Referring to FIG. 8B, the driving signal $V_d$ may include a signal section TS2 and a sink section SP2 for one period.

The signal section TS2 is formed by omitting the fourth section P4 from the signal section TS1 illustrated in FIG. 8A and adding a fifth section P5 with a second voltage level in before the first section P1. The fifth section P5 may be positioned before the first section P1 and may be connected to the first section P1.

That is, the signal section TS2 may include the fifth section P5 with a second level, the first section P1 with a first voltage level, the second section P2 with a second voltage level, and the third section P3 with a third voltage level. In addition, the sections P5, P1, P2, and P3 may be sequentially and continuously connected.

The duration of the second section P2 and duration of the fifth section P5 may be the same, the duration of the second section P2 and the duration of the fifth section P5 may each be shorter than the duration of the first section P1, and the duration of the first section P1 and the duration of the third section P3 may be the same, but embodiments of the present invention are not limited thereto.

Figure 9:
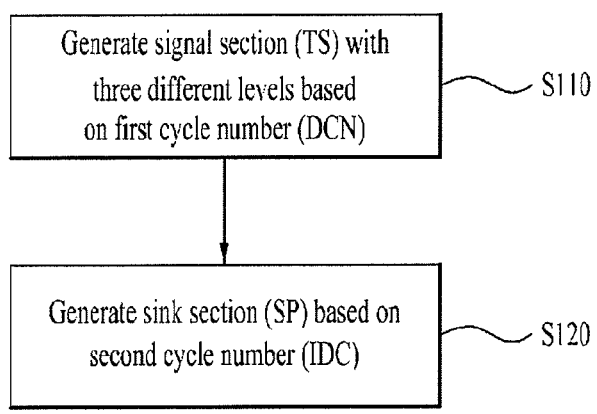
FIG. 9 is a flowchart illustrating a method of generating a driving signal by a signal generator illustrated in FIG. 7.

FIG. 9 is a flowchart illustrating a method of generating the driving signal $V_d$ by the signal generator 760 illustrated in FIG. 7.

Referring to FIG. 9, the signal generator 760 generates the signal section TS including sections with different voltage levels based on the first cycle number DCN of the driving clock signal D_CLK stored in the data storage 630 (S110).

The signal generator 760 generates the sink section SP for synchronization between a first driving signal $V_d$_ORI and the downsampling clock signal S_CLK2 of the digital signal processor 40 based on second cycle number IDC of the driving clock signal D_CLK calculated by the first to fifth calculators 710 to 750 (S120).

Figure 10A:
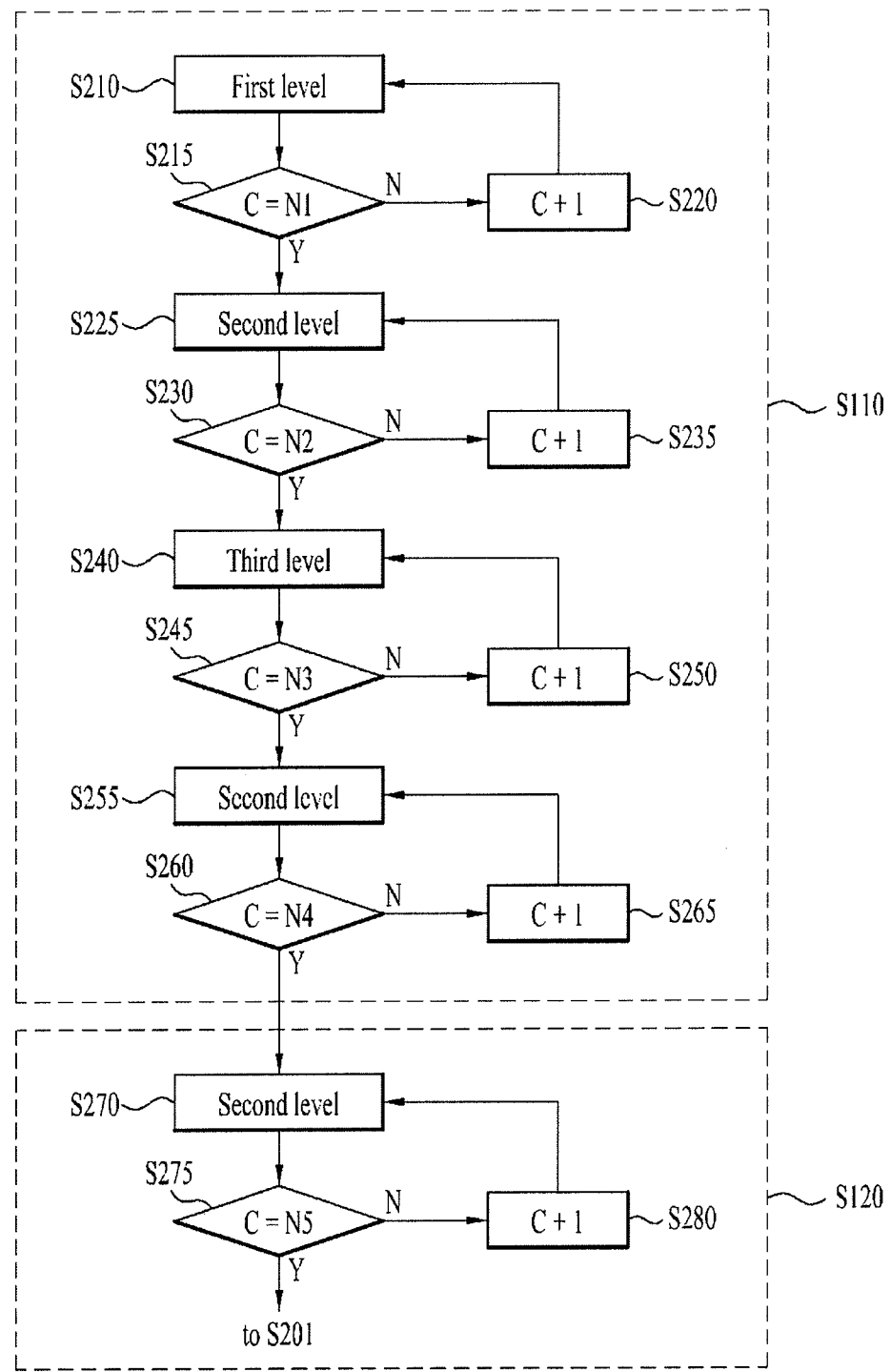
FIG. 10A illustrates an embodiment of a method of generating a signal section and a sink section illustrated in FIG. 9.

FIG. 10A illustrates an embodiment (TS1 and SP1) of a method for generating the signal section TS and the sink section SP illustrated in FIG. 9. FIG. 8A illustrates the driving signal $V_d$ generated according to FIG. 10A.

Referring to FIGS. 8A and 10A, the signal generator 760 may generate the signal section TS1 of the driving signal $V_d$ (S110) and generate the sink section SP1 of the driving signal $V_d$ (S120).

The signal generator 760 may generate the signal section TS1 so as to include the first through third sections P1 to P3.

The signal generator 760 generates the first section P1 of the signal section TS1 with a first voltage level (e.g., $+V_p$) in response to the driving clock signal D_CLK (S210).

A counter C determines whether a cycle number of a driving clock signal D-CLK is a first number N1 (S215). Here, the first number N1 may be a cycle number of a predetermined driving clock signal D_CLK corresponding to the first voltage level (e.g., $+V_p$) of the signal section TS1.

Whenever the driving clock signal D_CLK is clocked once, count of the counter C may be increased by 1 (C+1). Until the cycle number of the driving clock signal D_CLK is the first number N1, the first section P1 of the signal section TS1 may be maintained at the first voltage level (e.g., $+V_p$) (S210, S215, and S220).

When the cycle number of the driving clock signal D_CLK is the first number N1, the signal generator 760 generates the second section P2 of the signal section TS1 with a second voltage level (e.g., $V_{ss}$) (S225).

The counter C determines whether a cycle number of the driving clock signal D-CLK is a second number N2 (S230). Here, the second number N2 may be the cycle number of a predetermined driving clock signal D_CLK corresponding to the second voltage level (e.g., $V_{ss}$) of the signal section TS1.

Until the cycle number of the driving clock signal D_CLK is the second number N2, the second section P2 of the signal section TS1 may be maintained at the second voltage level (e.g., $V_{ss}$) in response to the driving clock signal D_CLK (S225, S230, and S235).

When the cycle number of the driving clock signal D_CLK is the second number N2, the signal generator 760 generates the third section P3 of the signal section TS1 with a third voltage level (e.g., $-V_n$) (S240).

The counter C determines whether the cycle number of the driving clock signal D-CLK is a third number N3 (S245). Here, the third number N3 may be the cycle number of the predetermined driving clock signal D_CLK corresponding to the third voltage level (e.g., $-V_n$) of the signal section TS1.

Until the cycle number of the driving clock signal D_CLK is the third number N3, the third section P3 of the signal section TS1 may be generated to be maintained at the third voltage level (e.g., $-V_n$) in response to the driving clock signal D_CLK (S240, S245, and S250).

The counter C determines whether the cycle number of the driving clock signal D-CLK is a fourth number N4 (S255). Here, the fourth number N4 may be the cycle number of the predetermined driving clock signal D_CLK corresponding to the second voltage level (e.g., $V_{ss}$) of the signal section TS1.

Until the cycle number of the driving clock signal D_CLK is the fourth number N4, the fourth section P4 of the signal section TS1 may be generated to be maintained at the second voltage level (e.g., $V_{ss}$) in response to the driving clock signal D_CLK (S255, S260, and S265).

When the cycle number of the driving clock signal D_CLK is the fourth number N4, generation of the signal section TS1 is completed, and the signal generator 760 generates the sink section SP1 of the driving signal $V_d$ with the second voltage level (e.g., $V_{ss}$) (S270).

The counter C determines whether the cycle number of the driving clock signal D-CLK is a fifth number N5 (S275). Here, the fifth number N5 may be the cycle number of the driving clock signal D_CLK corresponding to the sink section SP1 of the driving signal $V_d$.

For example, the digital signal processor 40 may calculate the fifth number N5 for generation of the sink section SP1 based on the second cycle number IDC.

When the cycle number of the driving clock signal D_CLK is the fifth number N5, generation of the sink section SP1 of the driving signal $V_d$ is completed, and the method returns to operation S210 to generate the sink section SP1 and the signal section TS1 of a driving signal $V_d$ of a next period.

Figure 10B:
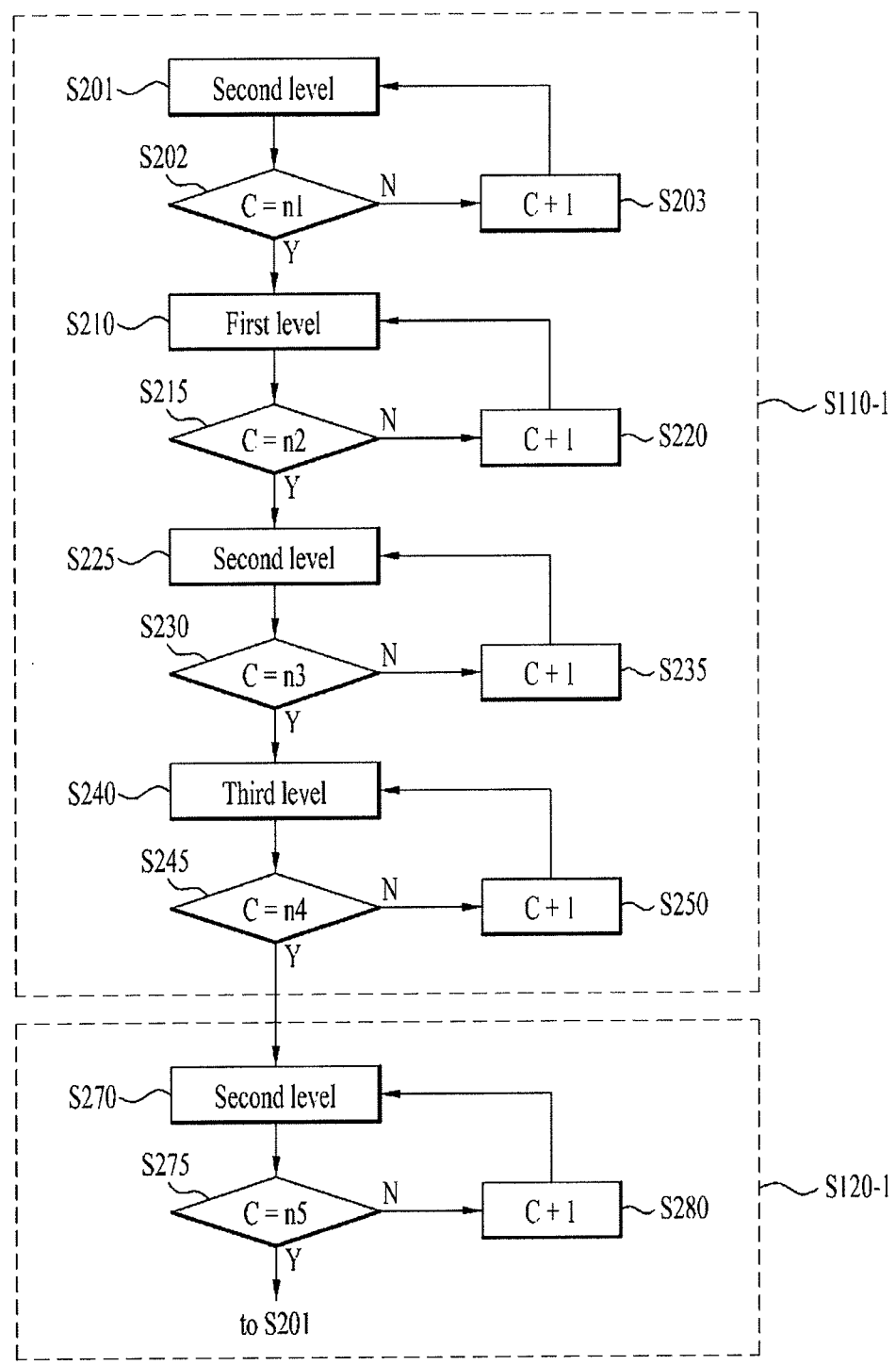
FIG. 10B illustrates another embodiment of a method of generating a signal section and a sink section illustrated in FIG. 9.

FIG. 10B illustrates another embodiment (TS2 and SP2) of a method of generating the signal section TS and the sink section SP illustrated in FIG. 9. FIG. 8B illustrates the driving signal $V_d$ generated according to FIG. 10B.

Referring to FIGS. 8B and 10B, the signal generator 760 may generate the signal section TS2 of the driving signal $V_d$ (S110-1) and generate the sink section SP2 of the driving signal $V_d$ (S120-1).

The signal generator 760 may generate the signal section TS2 so as to include the first to fifth sections P1 to P5.

The first to third sections P1 to P3 may be the same as in the description of FIG. 8A. Compared with the signal section TS1 illustrated in FIG. 8A, the signal section TS2 may further include the fifth section P5 that is positioned before the first section P1 and the fourth section P4 positioned after the third section P3 may be omitted.

The signal generator 760 may generate the fifth section P5 of the signal section TS2 of the second voltage level (e.g., $V_{ss}$) in response to the driving clock signal D_CLK (S201).

The counter C determines whether the cycle number of the driving clock signal D-CLK is a first number n1 (S202). Here, the first number n1 may be a cycle number of a predetermined driving clock signal D_CLK corresponding to a first the second voltage level (e.g., $V_{ss}$) of the signal section TS2.

Whenever the driving clock signal D_CLK is clocked once, count of the counter C may be increased by 1. Until the cycle number of the driving clock signal D_CLK is the first number n1, the fourth section P4 of the signal section TS2 may be generated to be maintained at the second voltage level (e.g., $V_{ss}$) (S201, S202, and S203).

When the cycle number of the driving clock signal D_CLK is the first number n1, operation S210 is performed.

Operations S210 to S250 illustrated in FIG. 10B may be the same as in the description of FIG. 10A, and the first to third sections P1, P2, and P3 may be generated. For example, n2=N1, n3=N2, and n4=N3 may be satisfied.

When the cycle number of the driving clock signal D_CLK is the fourth number N4, generation of the signal section TS2 is completed, and the sink section SP2 with the second voltage level (e.g., $V_{ss}$) is generated (S270).

The counter C determines whether the cycle number of the driving clock signal D_CLK is the fifth number N5 (S270). Here, the fifth number N5 may be the cycle number of the driving clock signal D_CLK corresponding to the sink section SP2 of the driving signal $V_d$.

For example, the digital signal processor 40 may calculate the fifth number N5 for generation of the sink section SP2 based on the second cycle number IDC.

When the cycle number of the driving clock signal D_CLK is the fifth number N5, generation of the sink section SP2 of the driving signal $V_d$ is completed, and the method returns to operation S201 to generate a driving signal $V_d$ of a next period.

The sink sections SP1 and SP2 may be synchronized to match a start point of a periodic pulse included in the driving signal and a start point of the second sampling clock signal S_CLK2.

Figure 11:
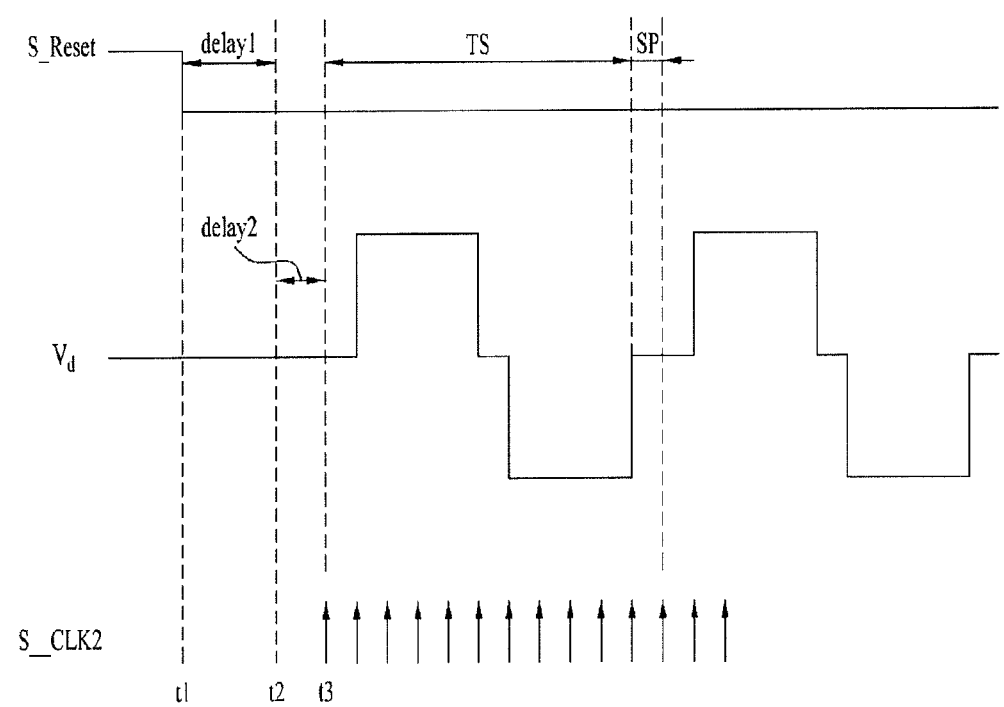
FIG. 11 is an operation timing diagram of a driving signal and a sensing operation of a sensor.

FIG. 11 is an operation timing diagram of a driving signal and a sensing operation of a sensor 30.

Referring to FIG. 11, the sensing operation of the sensor 30 may be started at a first point in time t1 and a driving operation of the driving signal $V_d$ may be started at a second point in time t2.

A first time delay delay1 may be present between the sensing point in time t1 and the driving operation point in time t2, and a second time delay delay2 may occur in a driving line Xn.

A driving frequency (or a period of a driving clock signal) and a sampling frequency (or a period of a sampling clock signal) may be preset and may not be changed.

According to some embodiments of the present invention, if the first time delay delay1 is present between the sensing point in time t1 and the driving operation point in time t2, a sink section (e.g., SP) may be automatically adjusted to synchronize the driving signal $V_d$ and the downsampling clock signal S_CLK2 of the digital signal processor 40, as described above.

According to some embodiments of the present invention, if time delay occurs between the driving lines X1 to Xn, the sink section (e.g., SP) may be automatically adjusted to synchronize the driving signal $V_d$ and the downsampling clock signal S_CLK2 of the digital signal processor 40, as described above.

Since the driving signal $V_d$ and the downsampling clock signal S_CLK2 of the digital signal processor 40 are synchronized with each other, the digital signal processor 40 may perform sampling on the same location of a signal (hereinafter, referred to as the "sensing signal") sensed by the sensor 30 at constant timing, and thus, variation in sampling data of the sensing signal due to a change in the driving signal $V_d$ may decrease. Accordingly, according to an embodiment of the present invention, even if a pulse number or periodicity of one driving signal $V_d$ is reduced, a desired signal-to-noise ratio may be obtained.

Here, when the driving signal $V_d$ is provided to the driving lines X1 to Xn, the sensing signal may be signals Vc1 to Vcm which are received by the sensor 30 or output signals DS1 to DSm of the analog-digital converter 430 of the sensor 30.

The digital signal processor 40 may perform sampling at the same location of the driving signal $V_d$ at constant timing, and thus, according to an embodiment of the present invention, sampling data of the sensing signal may be obtained and expected in a stable manner.

According to an embodiment of the present invention, noise may be easily recognized and processed by comparing first sampling data and second sampling data that are sampled by the digital signal processor 40. As such, abnormal input such as noise or the like may be easily recognized and processed, thereby increasing a signal-to-noise ratio.

Here, the first sampling data may be data formed by sampling an $n^{th}$ sensing signal by the digital signal processor 40 or data formed by sampling an $(n+1)^{th}$ sensing signal by the digital signal processor 40.

As illustrated in FIG. 7, since the driving signal generator 640 is embodied by simple logical circuits 710 to 750, complex timing control and F/W processing for synchronization is not required.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch sensor comprising:
a touch panel comprising driving lines, sensing lines, and a node capacitor formed between a driving line and a sensing line adjacent to one another;
a driver for providing a driving signal to each of the driving lines;
a sensor for converting an analog signal received from the sensing lines to an oversampled digital signal based on a first sampling clock signal; and
a digital signal processor for downsampling the oversampled digital signal based on a second sampling clock, and outputting a downloaded digital signal and filtering the downsampled digital signal,
wherein:
the digital signal processor generates the driving signal in response to a driving clock signal,
the driving signal comprises a signal section for driving of the driving lines, and a sink section for synchronizing the driving signal and the downsampled digital signal; and
wherein a duration of the sink section is a first difference determined by subtracting a value from a period of a second sampling clock signal, and wherein the value is a remainder obtained by dividing a period of the signal section by a period of the second sampling section.

2. The touch sensor according to claim 1, wherein:
the signal section comprises a first section with a first voltage level, a second section with a second voltage level, and a third section with a third voltage level; and
the second voltage level is less than the first voltage level and is greater than the third voltage level, and the sink section has the second voltage level.

3. The touch sensor according to claim 2, wherein the signal section further comprises a fourth section with a second voltage level after the third section or a fifth section with a second voltage level before the first section.

4. The touch sensor according to claim 3, wherein:
the driving signal is a periodic signal; and
the sink section is inserted between two adjacent signal sections.

5. The touch sensor according to claim 2, wherein the first section, the second section, and the third section are sequentially and continuously connected.

6. The touch sensor according to claim 1, wherein:
the digital signal processor comprises a first calculator for determining the period of the signal section by multiplying a first cycle number of the driving clock signal and a period of the driving clock signal to; and wherein the first cycle number is a cycle number of the driving clock signal for generation of the signal section.

7. The touch sensor according to claim 6, wherein:
the digital signal processor further comprises a second calculator for determining a period of the second sampling clock signal by multiplying a downsampling multiple and a period of the first sampling clock signal.

8. The touch sensor according to claim 7, wherein:
the digital signal processor further comprises a third calculator for determining a remainder by dividing the period of the signal section by the period of the second sampling clock signal to.

9. The touch sensor according to claim 8, wherein:
the digital signal processor further comprises a fourth calculator for determining a second difference by subtracting the remainder from the period of the second sampling clock signal.

10. The touch sensor according to claim 9, wherein the digital signal processor further comprises a fifth calculator for dividing the second difference by the period of the driving clock signal to output a second cycle number of the driving clock signal according to a division result, and generates the sink section in response to the driving clock signal during the second cycle number.

11. A touch sensor comprising:
a touch panel comprising driving lines, sensing lines, and a node capacitor formed between a driving line and a sensing line adjacent to one another;
a driver for providing a driving signal comprising signal sections and a sink section inserted between the signal sections to each of the driving lines;
a sensor for converting an analog signal received from the sensing lines to an oversampled digital signal based on a first sampling clock signal; and
a digital signal processor for downsampling the oversampled digital signal based on a second sampling clock signal to output a downsampled digital signal,
wherein:
the digital signal processor generates the driving signal in response to a driving clock signal,
wherein each of the signal sections comprises a first section with a first voltage level, a second section with a second voltage level less than the first voltage level, and a third section with a third voltage level less than the second voltage level, and wherein the sink section has the second voltage level, and
wherein duration of the sink section is a difference determined by subtracting a value from a period of the second sampling clock signal, and the value is a remainder determined by dividing a period of the signal section by a period of the second sampling section.

12. The touch sensor according to claim 11, wherein the sensor comprises:
an amplifier for amplifying a signal received from each of the sensing lines to output an amplification signal according to an amplification result;
a comparator for comparing the amplification signal and a first reference signal to output a comparison signal according to a comparison result; and
an analog-digital converter for converting the comparison signal to an oversampled digital signal based on the first sampling clock signal.

13. The touch sensor according to claim 12, wherein the analog-digital converter comprises:
a delta unit for outputting a difference signal corresponding to a difference between the comparison signal and an analog feedback signal;
a sigma unit for integrating the difference signal to output an integration signal according to an integration result;
a quantizer for quantizing the integration signal in response to the first sampling clock signal to output the oversampled digital signal according to a quantization result; and
a digital-analog converter for converting the oversampled digital signal to output the analog feedback signal based on a conversion result.

14. The touch sensor according to claim 11, wherein the first section, the second section, and the third section are sequentially and continuously connected.

15. A touch sensor comprising:
a touch panel comprising driving lines, sensing lines, and a node capacitor formed between a driving line and a sensing line adjacent to one another;

a driver for providing a driving signal comprising signal sections and a sink section inserted between the signal sections to each of the driving lines;

a sensor for converting an analog signal received from the sensing lines to an oversampled digital signal based on a first sampling clock signal; and a digital signal processor for downsampling the oversampled digital signal based on a second sampling clock signal to output a downsampled digital signal, wherein:

the digital signal processor generates the driving signal in response to a driving clock signal, wherein each of the signal sections comprises a first section with a first voltage level, a second section with a second voltage level less than the first voltage level, and a third section with a third voltage level less than the second voltage level, and wherein the sink section has the second voltage level, and wherein the digital signal processor comprises a decimator for downsampling the oversampled digital signal by as much as a predetermined downsampling multiple to output the downsampled digital signal according to a downsampling result, and wherein the digital signal processor further comprises a data storage for storing a first cycle number of the driving clock signal for formation of the signal section, a period of the driving clock signal, a downsampling multiple of the decimator, and a period of the first sampling clock signal.

16. The touch sensor according to claim 15, wherein the digital signal processor further comprises a driving signal generator comprising:

a first calculator for multiplying the first cycle number and a period of the driving clock signal to determine a first period of the signal section;

a second calculator for multiplying the downsampling multiple and a period of the first sampling clock signal to determine a second period of the second sampling clock signal;

a third calculator for calculating a remainder obtained by dividing the first period by the second period;

a fourth calculator for determining a difference according to a result obtained by subtracting the remainder from the second period; and a fifth calculator for determining a second cycle number of the driving clock signal for formation of the sink section according to a division result obtained by dividing the difference by a period of the driving clock signal.

17. The touch sensor according to claim 16, wherein the digital signal processor further comprises a signal generator for generating the signal section based on the first cycle number of the driving clock signal stored in the data storage and for generating the sink section based on the second cycle number of the driving clock signal provided from the driving signal generator.

18. The touch sensor according to claim 15, wherein the first section, the second section, and the third section are sequentially and continuously connected.

* * * * *